United States Patent
Shimbo et al.

(10) Patent No.: US 11,370,431 B2
(45) Date of Patent: Jun. 28, 2022

(54) VEHICLE CONTROL DEVICE

(71) Applicant: Toyota Jidosha Kabushiki Kaisha, Toyota (JP)

(72) Inventors: Yuto Shimbo, Toyota (JP); Yuma Hoshikawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 128 days.

(21) Appl. No.: 16/826,790

(22) Filed: Mar. 23, 2020

(65) Prior Publication Data

US 2020/0307581 A1 Oct. 1, 2020

(30) Foreign Application Priority Data

Mar. 25, 2019 (JP) .............................. JP2019-056653

(51) Int. Cl.
*B60W 30/16* (2020.01)
*B60W 30/14* (2006.01)

(52) U.S. Cl.
CPC .......... *B60W 30/16* (2013.01); *B60W 30/143* (2013.01)

(58) Field of Classification Search
CPC .... B60W 30/16; B60W 30/143; B60W 30/08; B60W 50/087; B60W 2540/10; B60W 30/14; B60W 30/17; B60W 2554/802; B60W 30/165; B60W 2520/105; B60W 2554/801; B60W 2554/804; B60W 2554/803; B60W 2554/4042; B60K 31/0008

See application file for complete search history.

(56) References Cited

U.S. PATENT DOCUMENTS

2003/0045990 A1* 3/2003 Adachi .............. B60K 31/0008
                                                                        180/170
2006/0025918 A1    2/2006 Saeki
                         (Continued)

FOREIGN PATENT DOCUMENTS

DE   102016203021 A1 * 8/2017    ............ B60W 50/08
EP        1336526 A2    8/2003
                  (Continued)

*Primary Examiner* — Nicholas Kiswanto
*Assistant Examiner* — Danielle Marie Jackson
(74) *Attorney, Agent, or Firm* — Dinsmore & Shohl LLP (57) ABSTRACT

A vehicle control device comprises an operation amount sensor for measuring an operation amount of an accelerator element, an object sensor for detecting an object ahead of a vehicle, and a controller for applying a normal operation drive force which is determined depending on the operation amount to the vehicle. The controller executes an adaptive cruise control for applying a drive force required for an acceleration of the vehicle to become equal to an adaptive cruise control acceleration to the vehicle. The adaptive cruise control acceleration is an acceleration which increases as a difference between an inter-vehicle distance from the vehicle to an objective-forward-vehicle and a target inter-vehicle distance increases. When an erroneous operation start condition becomes satisfied, the controller ends the adaptive cruise control, and executes an erroneous operation related control for applying a drive force which is smaller than the normal operation drive force to the vehicle.

2 Claims, 5 Drawing Sheets

(56) References Cited

U.S. PATENT DOCUMENTS

| | | | | |
|---|---|---|---|---|
| 2006/0212207 A1* | 9/2006 | Sugano | ................ | B60W 10/06 |
| | | | | 701/93 |
| 2015/0203126 A1* | 7/2015 | Kobana | ................ | B60K 28/06 |
| | | | | 701/93 |
| 2020/0117192 A1* | 4/2020 | Satoh | ...................... | G08G 1/16 |

FOREIGN PATENT DOCUMENTS

| JP | H10-338052 A |   | 12/1998 |
|---|---|---|---|
| JP | 2003-237409 A |   | 8/2003 |
| JP | 2006-315491 A |   | 11/2006 |
| JP | 4172434 B2 |   | 10/2008 |
| JP | 2011173586 A | * | 9/2011 |
| JP | 4929777 B2 |   | 5/2012 |
| JP | 2013-129228 A |   | 7/2013 |
| JP | 2014-148293 A |   | 8/2014 |
| JP | 2019-023021 A |   | 2/2019 |

* cited by examiner

VEHICLE CONTROL DEVICE

CROSS-REFERENCE TO RELATED APPLICATIONS

The present application claims priority to Japanese Patent Application No. 2019-056653 filed Mar. 25, 2019, the entire contents of which are incorporated herein by reference.

TECHNICAL FIELD

The present disclosure relates to a vehicle control device configured to execute an adaptive cruise control and an erroneous operation related control. The adaptive cruise control is a control for having a vehicle travel with keeping an inter-vehicle distance between a vehicle and an objective-forward-vehicle at a constant distance. The erroneous operation related control is executed when an erroneous operation state occurs. The erroneous operation state is a state in which a driver operates an accelerator with mistaking the accelerator for another driving operation element. The erroneous operation related control is a control for making a drive force which is smaller than a drive force which is determined depending on an operation amount of the accelerator act to the vehicle.

BACKGROUND

Hitherto, there has been known a vehicle control device (hereinafter, referred to as "a first conventional device") which is configured to execute an adaptive cruise control. For example, the first conventional device is disclosed in Japanese Patent Application Laid-open No. 2019-23021. The first conventional device calculates a target acceleration Gtgt based on a relative speed Vf(a) of an objective-forward-vehicle in relation to a vehicle and an inter-vehicle difference ΔD1 which is acquired by subtracting a target inter-vehicle distance Dtgt from an inter-vehicle distance Dfx(a). More specifically, the first conventional device acquires the target acceleration Gtgt according to the following equation (1).

$$Gtgt = ka1 \cdot (k1 * \Delta D1 + k2 * Vfx(a)) \quad (1)$$

The ka1, k1, and k2 in the above equation (1) are predetermined positive gains (coefficients).

There has also been known a vehicle control device (hereinafter, referred to as "a second conventional device") which is configured to determine that the erroneous operation state has occurred when an operation amount of an accelerator is equal to or larger than a threshold operation amount under a situation in which a vehicle speed is equal to or lower than a threshold vehicle speed and an obstacle is being detected. The second conventional device executes an erroneous operation related control when it is determined that the erroneous operation state has occurred.

The erroneous operation state is a state in which the driver operates the accelerator with mistaking the accelerator for another driving operation element. For example, the second conventional device is disclosed in Japanese Patent Application Laid-open No. 2013-129228.

SUMMARY

The present inventor(s) has been studying a vehicle control device (hereinafter, referred to as "a device under study") which is configured to be able to execute both of the adaptive cruise control and the erroneous operation related control.

If the objective-forward-vehicle decelerates when the device under study is executing the adaptive cruise control, the vehicle decelerates. In a case where this deceleration causes the vehicle speed to become equal to or lower than the threshold operation amount, the device under study determines that the erroneous operation state has occurred so as to start the erroneous operation related control when an obstacle (object) is detected and the operation amount of the accelerator becomes equal to or larger than the threshold operation amount. If the objective-forward-vehicle starts accelerating while the erroneous operation related control is limiting a drive force of the vehicle, both of the relative speed Vf(a) and the inter-vehicle difference ΔD1 increase (become higher/larger), as time passes. Hereby, the target acceleration Gtgt which is acquired according to the above equation (1) increases (become higher/larger) as time passes.

When the device under study ends the erroneous operation related control upon detecting the end of the erroneous operation, the device under study accelerates the vehicle suddenly at the target acceleration Gtgt which has become a large value. The sudden acceleration of the vehicle at the high target acceleration has a high possibility to give an uncomfortable feeling to the driver.

The present disclosure has been made to solve the problem described above. The present disclosure has an object to provide a vehicle control device which can prevent the adaptive cruise control from accelerating the vehicle suddenly when the vehicle control device ends the erroneous operation related control, so as not to give the uncomfortable feeling to the driver.

A vehicle control device according to the present disclosure comprises:

an operation amount sensor (22) for measuring an operation amount (AP) of an accelerator element (22a) which a driver of a vehicle operates in order to accelerate the vehicle;

an object sensor (11, 12, 14, 15) for detecting an object ahead of the vehicle; and a controller (10, 20, 26, 30, 36) for applying a normal operation drive force which is determined depending on the operation amount to the vehicle, while executing neither an adaptive cruise control nor an erroneous operation related control.

Furthermore, the controller is configured to:

execute the adaptive cruise control (Step 435, Step 440) for applying a drive force which is required for an acceleration of the vehicle to become equal to an adaptive cruise control target acceleration (ACC_Gtgt) to the vehicle, during a time period from a time point at which an adaptive cruise control start condition becomes satisfied ("Yes" at Step 410) to a time point at which an adaptive cruise control end condition becomes satisfied ("Yes" at Step 450), the adaptive cruise control target acceleration being an acceleration which increases as a difference between an inter-vehicle distance from the vehicle to an objective-forward-vehicle and a target inter-vehicle distance increases, the objective-forward-vehicle is another vehicle which is ahead of the vehicle and is detected by the object sensor;

end the adaptive cruise control ("No" at Step 445, Step 455), even if the adaptive cruised control end condition has not been satisfied, when an erroneous operation start condition becomes satisfied ("Yes" at Step 510, "Yes" at Step 515, "Yes" at Step 520, Step 525) in a time period from a time point at which the adaptive cruise control start condition becomes satisfied to a time point at which the adaptive cruise control end condition becomes satisfied ("No" at Step 405), the erroneous operation start condition being a condition which becomes satisfied when an erroneous operation state in which the driver operates the accelerator with mistaking the accelerator element for another driving operation element occurs; and execute the erroneous operation related control for applying a drive force which is smaller than the normal operation drive force to the vehicle (Step 530, Step 535) during a time period from a time point at which the erroneous operation start condition becomes satisfied to a time point at which an erroneous operation end condition becomes satisfied, the erroneous operation end condition being a condition which becomes satisfied when the erroneous operation state ends.

The vehicle control device further comprises a vehicle speed sensor (32) for measuring a vehicle speed of the vehicle.

The controller is configured to:

determine that the adaptive cruise control start condition becomes satisfied when the controller receives an input indicative of a start operation which the driver performs in order to request the controller to start the adaptive cruise control ("Yes" at Step 410);

determine that the adaptive cruise control end condition becomes satisfied when the controller receives an input indicative of an end operation which the driver performs in order to request the controller to end the adaptive cruise control ("Yes" at Step 450);

determine that the erroneous operation start condition becomes satisfied when the operation amount becomes equal to or larger than a first threshold operation amount ("Yes" at Step 520) under a situation in which the vehicle speed is equal to or lower than a threshold speed ("Yes" at Step 510) and the object is present/located in a predetermined area around the vehicle ("Yes" at Step 515); and determine that the erroneous operation end condition becomes satisfied when the operation amount becomes equal to or smaller than a second threshold operation amount which is smaller than the first threshold operation amount ("Yes" at Step 540) after the erroneous operation start condition has become satisfied.

If the adaptive cruise control continues being executed while the erroneous operation related control is being executed, a difference between the inter-vehicle distance and the target inter-vehicle distance may become large. If this happens, when the erroneous operation related control is ended, the vehicle accelerates suddenly at the adaptive cruise control target acceleration which has a large value. When the present control device starts the erroneous operation related control, the present control device ends the adaptive cruise control, even if the adaptive cruise control end condition is not satisfied. Thus, the present control device can prevent the adaptive cruise control from accelerating the vehicle suddenly when and after it ends the erroneous operation related control. As a result, the present control device can prevent the adaptive cruise control from giving the uncomfortable feeling to the driver.

In the above description, in order to facilitate the understanding of the disclosure, reference symbols used in embodiment of the present disclosure are enclosed in parentheses and are assigned to each of the constituent features of the disclosure corresponding to the embodiment. However, each of the constituent features of the disclosure is not limited to the embodiment as defined by the reference symbols. Other objects, other features, and accompanying advantages of the present disclosure can be readily understood from a description of the embodiments of the present disclosure provided referring to the accompanying drawings.

DETAILED DESCRIPTION

Figure 1:
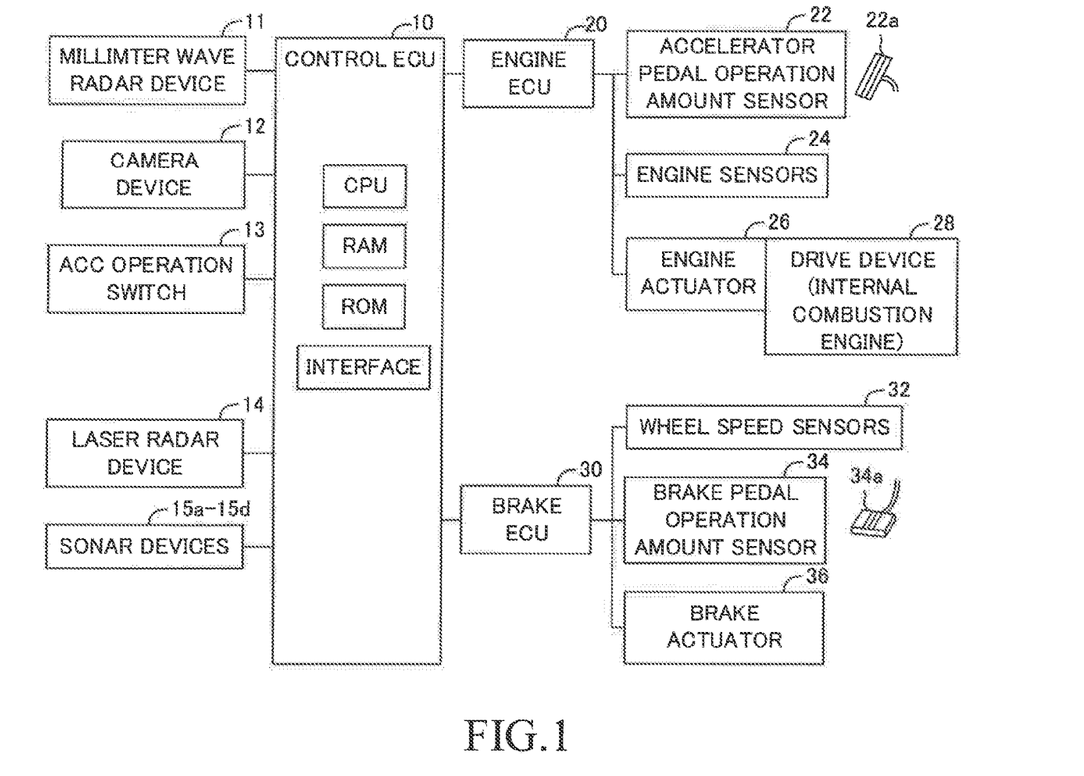
FIG. 1 is a schematic system configuration diagram of a vehicle control device (the present control device) according to an embodiment.
Figure 2:
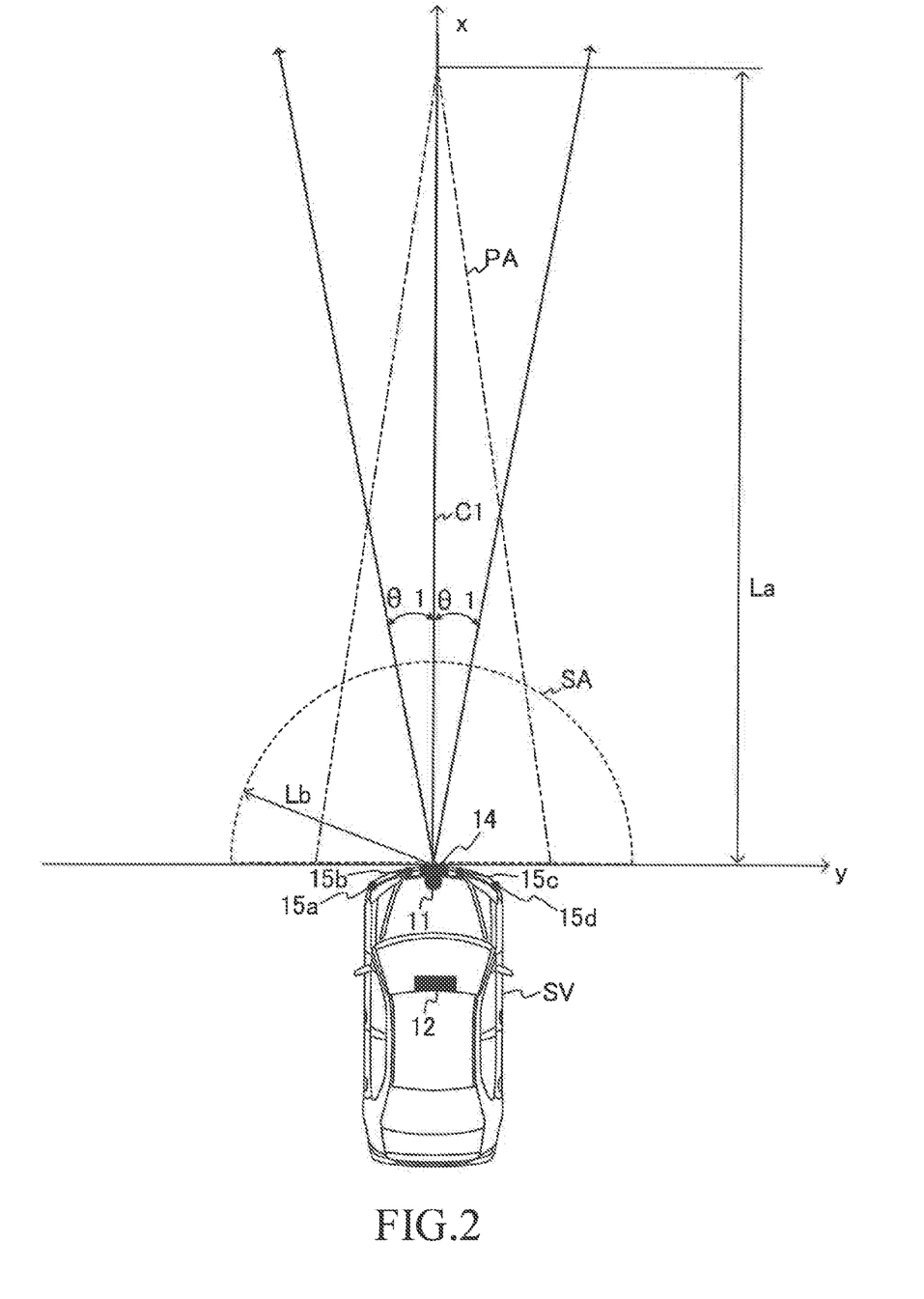
FIG. 2 is a top view diagram for illustrating arrangement positions of a millimeter wave radar device, a camera device, a laser radar device, and sonar devices illustrated in FIG. 1.

A vehicle control device (hereinafter, referred to as a "present control device") according to an embodiment of the present disclosure is installed in a vehicle SV (referring to FIG. 2). The present control device comprises a control ECU 10, an engine ECU 20, and a brake ECU 30. The above ECUs are connected to each other via a controller area network (CAN) (not shown) to be able to mutually transmit and receive information to/from those ECUs.

The ECU is an abbreviation of an "Electronic Control Unit". The ECU (i.e., electronic control circuit) includes, as a main component, a microcomputer having a CPU, a ROM, a RAM, an interface, and the like. The CPU achieves various functions through executing instructions (routines) stored in the ROM. Some or all of those ECUs may be integrated into a single ECU.

The present control device further comprises a millimeter wave radar device 11, a camera device 12, an adaptive cruise control operation switch 13 (hereinafter, referred to as "an ACC operation switch 13"), a laser radar device 14, sonar devices 15a to 15d, an accelerator pedal operation amount sensor 22, an accelerator pedal (an accelerator element) 22a, engine sensors 24, an engine actuator 26, a drive device (an internal combustion engine) 28, wheel speed sensors 32, a brake pedal operation amount sensor 34, a brake pedal 34a, and a brake actuator 36. The millimeter wave radar device 11, the camera device 12, the ACC operation switch 13, the laser radar device 14, and the sonar devices 15a to 15d are connected to the control ECU 10. The sonar devices 15a to 15d are referred to as "sonar devices 15", when they do not need to be distinguished from each other. The laser radar device 14 and the sonar devices 15 will be described later in greater detail when describing a modification example of the present embodiment.

The millimeter wave radar device 11 has an unillustrated millimeter wave transmission and reception unit and an unillustrated processing unit. As shown in FIG. 2, the millimeter wave radar device 11 is provided at a position (hereinafter, referred to as "a front end center position") which is at a front end of the vehicle SV and a center in a vehicle width direction of the vehicle SV. The millimeter wave transmission and reception unit transmits a millimeter wave which propagates/spreads in an area having a center axis C1 which extends in/along a center axis of the vehicle SV in the vehicle width direction of the vehicle SV. The area is defined by a line forming a predetermined angle θ1 in a right direction from the center axis C1 and a line forming the predetermined angle θ1 in a left direction from the center axis C1. The direction in which the center axis C1 extends is referred to as "an x axis direction" or "a longitudinal direction". The right direction is referred to as "a y axis direction illustrated" or "a lateral direction". An object (e.g., an other vehicle, a pedestrian, a two-wheeled vehicle (a motorcycle, or a bicycle), or the like) present in the area reflects the transmitted millimeter wave. The millimeter transmission and reception unit receives the reflected wave.

The processing unit of the millimeter wave radar device 11 obtains a longitudinal distance Dfx(n), a relative speed Vfx(n), a lateral distance Dfy(n), and a relative lateral speed Vfy(n) of each detected object (n), based on a phase difference between the transmitted millimeter wave and the received reflected wave, an attenuation level of the reflected wave, a time from a time point at which the millimeter wave is transmitted to a time point at which the reflected wave of the millimeter wave is received, and the like, every time a predetermined time elapses. The processing unit transmits, as object information of each objects (n), the longitudinal distance Dfx(n), the relative speed Vfx(n), the lateral distance Dfy(n), and the relative lateral speed Vfy(n), to the control ECU 10, every time a predetermined time elapses.

The longitudinal distance Dfx(n) is a distance between the vehicle SV and the object (n) in the longitudinal direction. The relative speed Vfx(n) is a relative speed of the object (n) in relation to the vehicle SV in the longitudinal direction.

The lateral distance Dfy(n) is a distance between a center position of the object (n) and the center axis of the vehicle SV in the lateral direction. For example, when the object (n) is the other vehicle, the center position of the object (n) is a center position in the vehicle width direction of the other vehicle. The lateral distance Dfy(n) may be referred to as "a lateral position". The relative lateral speed Vfy(n) is a relative speed of the center position of the object (n) in relation to the vehicle SV in the lateral direction.

The camera device 12 has stereo cameras and an image processing unit. The stereo cameras photograph a scene of a front left side and a scene of a front right side of the vehicle SV respectively to obtain a pair of a left picture and a right picture as image data. The image processing unit obtains a type of the object (n) and a position of the object (n) in relation to the vehicle SV based on the image data which is obtained by the stereo cameras. The type of the object (n) includes a vehicle, a motorcycle, a bicycle, a pedestrian, and the like. The image processing unit transmits, as object information, the type of the object (n), the position of the object (n) in relation to the vehicle SV, and the like to the control ECU 10, every time a predetermined time elapses.

The control ECU 10 finalizes the object information which includes the position of the object based on "the position of the object which is obtained by the millimeter wave radar device 11" and "the position of the object which is obtained by the camera device 12".

The ACC operation switch 13 is a switch which the driver operates when the driver requests the control ECU 10 to start or end an adaptive cruise control (ACC) described later. The ACC operation switch 13 transmits an operation signal to the control ECU 10 when the driver operates the ACC operation switch 13. When the control ECU 10 receives the operation signal while the control ECU 10 is not executing the adaptive cruise control, the control ECU 10 regards the operation signal as an ACC start signal indicating that the driver requests the control ECU 10 to start the adaptive cruise control. Whereas, when the control ECU 10 receives the operation signal while the control ECU 10 is executing the adaptive cruise control, the control ECU 10 regards the operation signal as an ACC end signal indicating that the driver requests the control ECU 10 to end the adaptive cruise control.

Furthermore, an unillustrated setting switch is provided in the vicinity of the ACC operation switch 13. The driver operates the setting switch in order to change and/or set a target inter-vehicle distance Dtgt and a target vehicle speed which are used in the adaptive cruise control.

The engine ECU 20 is connected to the accelerator pedal operation amount sensor 22 and the engine sensors 24. The engine ECU 20 receives detection signals transmitted from these sensors 22 and 24.

The accelerator pedal operation amount sensor 22 measures an operation amount of the accelerator pedal 22a of the vehicle SV (hereinafter, referred to as "an accelerator pedal operation amount AP") to transmit a detection signal indicative of the accelerator pedal operation amount AP to the engine ECU 20. The accelerator pedal 22a is an acceleration operation element (an accelerator) which the driver operates in order to increase a drive force generated by the drive device (the internal combustion engine in the present embodiment) 28 to accelerate the vehicle SV.

The accelerator pedal operation amount AP is "0%" when the driver does not operate the accelerator pedal 22a (in other words, when the driver does not depress the accelerator pedal 22a). The accelerator pedal operation amount AP becomes larger as the driver depresses the accelerator pedal 22a larger/deeper. The accelerator pedal operation amount AP becomes "100%" when the driver depresses the accelerator pedal 22a to maximum.

The engine ECU 20 transmits, to the control ECU 10, the detection signal which is transmitted from the accelerator pedal operation amount sensor 22 and which is received by the engine ECU 20. The control ECU 10 communicates with the engine ECU 20 to obtains the accelerator pedal operation amount AP.

The engine sensors 24 is a sensor for measuring various drive state amounts of the internal combustion engine 28. The engine sensors 24 include a throttle valve opening degree sensor, an engine rotation speed sensor, an intake air amount sensor, and the like.

Furthermore, the engine ECU 20 is connected to engine actuators 26. For example, the engine actuators 26 include a throttle valve actuator and fuel injectors. The engine ECU 20 changes torque which the internal combustion engine 28 generates through driving the engine actuator 26 to adjust drive force acted to the vehicle SV.

The engine ECU 20 determines a first target throttle valve opening degree TA1tgt based on the vehicle speed Vsv of the vehicle SV and the accelerator pedal operation amount AP of the vehicle SV. More specifically, the engine ECU 20 determines the first target throttle valve opening degree TA1tgt by applying the vehicle speed Vsv and the accelerator pedal operation amount AP to a look-up table MapTA1 (Vsv, AP). According to the look-up table MapTA1(Vsv, AP), the first target throttle valve opening degree TA1tgt becomes larger as the accelerator pedal operation amount AP becomes larger. Furthermore, according to the MapTA1 (Vsv, AP), when the accelerator pedal operation amount AP is an arbitrary value, the first target throttle valve opening degree TA1tgt becomes larger as the vehicle speed Vsv becomes higher.

In a normal state in which neither the adaptive cruise control nor an erroneous operation related control described later is being executed, the engine ECU 20 controls the engine actuators 26 in such a manner that an actual throttle valve opening degree TA becomes equal to the first target throttle valve opening degree TA1tgt. Thus, in this case, a drive force (hereinafter, referred to as "a normal operation drive force" or "a drive force when not executing the erroneous operation related control") is determined based on the vehicle speed Vsv, the accelerator pedal operation amount AP, and the table MapTA1(Vsv, AP), and the determined normal operation drive force is applied to the vehicle SV.

The brake ECU 30 is connected to the wheel speed sensors 32 and the brake pedal operation amount sensor 34. The brake ECU 30 receives detection signals transmitted from these sensors 32 and 34.

The wheel speed sensors 32 are provided for wheels (a front left wheel, a front right wheel, a rear left wheel, and a rear right wheel) of the vehicle SV, respectively. Each of the wheel speed sensors 32 generates one pulse signal (a wheel pulse signal) PS, when the corresponding wheel rotates by a predetermined angle. The control ECU 10 counts the number of the pulse signals transmitted from each of the wheel speed sensors 32 for/within a predetermined time, and calculates a rotation speed (a wheel speed) of the corresponding wheel based on the counted number of the pulse signals. The control ECU 10 calculates a vehicle speed Vs indicative of a speed of the vehicle SV based on the rotation speeds of the wheels. For example, the control ECU 10 calculates the average of the rotation speeds of the four wheels as the vehicle speed Vsv.

The brake pedal operation amount sensor 34 measures an operation amount of the brake pedal 34a of the vehicle SV (hereinafter, referred to as "a brake pedal operation amount BP") to transmit a detection signal indicative of the brake pedal operation amount BP to the brake ECU 30. The brake pedal 34a is a deceleration operation element (a decelerator) which the driver operates in order to apply brake force to the wheels of the vehicle SV.

The brake pedal operation amount BP is "0%" when the driver does not operate the brake pedal 34a (in other words, when the driver does not depress the brake pedal 34a). The brake pedal operation amount BP becomes larger as the driver depresses the brake pedal 34a larger/deeper.

The brake ECU 30 is connected to the brake actuator 36. The brake actuator 36 is a hydraulic control actuator. The brake actuator 36 is provided in an unillustrated hydraulic circuit between an unillustrated master cylinder and unillustrated friction brake devices. The master cylinder pressurizes working oil by using a depressing force applied to the brake pedal 34a. The frictional brake devices include well-known wheel cylinders. The wheel cylinders are provided in the wheels respectively. The brake actuator 36 adjusts oil pressure applied to each of the wheel cylinders.

The brake ECU 30 determines a target operation acceleration that has a negative value based on the brake pedal operation amount BP. More specifically, the target operation acceleration becomes lower (in other words, a target operation deceleration becomes higher) as the brake pedal operation amount BP becomes larger. The brake ECU 30 drives the brake actuator 36 based on the determined target operation acceleration to adjust the oil pressure of the working oil applied to each of the wheel cylinders. The brake force (friction brake force) is applied to each of the wheels so that a deceleration (the acceleration that has the negative value) of the vehicle SV becomes equal to the target operation acceleration.

The control ECU 10 executes both of the adaptive cruise control and the erroneous operation related control. The adaptive cruise control and the erroneous operation related control will next be described.

<Adaptive Cruise Control>

The adaptive cruise control is a driving support control which includes a cruise control (hereinafter, referred to as "a CC") and an inter-vehicle distance control described later. The cruise control (CC) is a well-known control for having/making the vehicle SV travel in such a manner that the vehicle speed Vsv of the vehicle SV becomes equal to a target speed which is set by the driver without the driver's operation on/to the accelerator pedal 22a. The inter-vehicle distance control is a control for having/making the vehicle SV follow an objective-forward-vehicle which travels ahead of the vehicle SV with keeping "an inter-vehicle distance between the objective-forward-vehicle and the vehicle SV" at a predetermined distance. Such an adaptive cruise control is well-known, and disclosed in Japanese Patent Application Laid-open No. 2003-237409, Japanese Patent Application Laid-open No. 2014-148293, Japanese Patent Application Laid-open No. 2006-315491, Japanese Patent No. 4,162,434, and Japanese Patent No. 4,929,777. The adaptive cruise control will be described briefly.

The control ECU 10 determines that the adaptive cruise control start condition has become satisfied to start the adaptive cruise control, when it receives the operation signal transmitted from the ACC operation switch 13 while it is not executing the adaptive cruise control. The control ECU 10 determines that the adaptive cruise control end condition has become satisfied to end the adaptive cruise control, when it receives the operation signal transmitted from the ACC operation switch 13 while t it is executing the adaptive cruise control.

In executing the adaptive cruise control, the control ECU 10 firstly specifies the objective-forward-vehicle based on the object information transmitted from the millimeter wave radar device 11 and the object information transmitted from the camera device 12. For example, the control ECU 10 determines whether or not a relative position of the object (n) is within a predetermined objective-forward-vehicle area PA (referring to FIG. 2). The relative position of the object (n) is specified based on "the lateral distance Dfy(n) and the longitudinal distance Dfx(n)" of the object (n). As shown in FIG. 2, the objective-forward-vehicle area PA has been set in advance in such a manner that the area PA has a longitudinal distance La in the x-direction from the front end of the vehicle SV and a lateral distance which becomes shorter as the longitudinal distance from the front end of the vehicle SV becomes longer.

The control ECU 10 selects a vehicle which has been located in the objective-forward-vehicle area PA for a predetermined time as the objective-forward-vehicle. It should be noted that the camera device 12 determines whether or not the object is the vehicle. Furthermore, when there are a plurality of candidates of the objective-forward-vehicles, the control ECU 10 selects the vehicle having the shortest longitudinal distance (the shortest inter-vehicle distance) Dfx(n) among the candidates as the objective-forward-vehicle.

Subsequently, the control ECU 10 calculates the inter-vehicle difference ΔD1 by subtracting the target inter-vehicle distance Dtgt from the inter-vehicle distance (the longitudinal distance) Dfx(a) of the objective-forward-vehicle. As described above, the driver operates the unillustrated setting switch to set the target inter-vehicle distance Dtgt.

The control ECU 10 obtains a target acceleration Gtgt by applying the inter-vehicle difference ΔD1 and the relative speed Vfx(a) of the objective-forward-vehicle to the above equation (1). The control ECU 10 transmits the target acceleration Gtgt to the engine ECU 20 and the brake ECU 30. The target acceleration Gtgt may be referred to "an adaptive cruise control target acceleration ACC_Gtgt" or "a target acceleration ACC_Gtgt".

The control ECU 10 executes the cruise control (CC) when there is no objective-forward-vehicle in the objective-forward-vehicle area PA. The target acceleration Gtgt which is used in the cruise control may be referred to "a cruise control target acceleration CC_Gtgt" or "a target acceleration CC_Gtgt". The control ECU 10 transmits the target acceleration Gtgt to the engine ECU 20 and the brake ECU 30.

When the engine ECU 20 receives any one of the target acceleration ACC_Gtgt and the target acceleration CC_Gtgt, the engine ECU 20 determines a second target throttle valve opening degree TA2tgt for having/making the actual acceleration of the vehicle SV become equal to the received target acceleration. The control ECU 10 obtains the acceleration of the vehicle SV at the present time point by dividing "a subtraction value which is obtained by subtracting the vehicle speed Vsv2 which is measured a predetermined time ago before the present time point from the vehicle speed Vsv1 which is measured at the present time point" by the predetermined time.

The engine ECU 20 selects, as a final target throttle valve opening degree, the first target throttle valve opening degree TA1tgt or the second target throttle valve opening degree TA2tgt, whichever is larger. The engine ECU 20 controls the engine actuator 26 in such a manner that the actual throttle valve opening degree TA becomes equal to the final target throttle valve opening degree.

When the brake ECU 30 receives any one of the target acceleration ACC_Gtgt and the target acceleration CC_tgt, the brake ECU 30 controls the brake actuator 36 based on the target operation acceleration, if the received target acceleration has a positive value. Whereas, the brake ECU 30 controls the brake actuator based on the received target acceleration or the target operation acceleration, whichever is lower.

<Erroneous Operation Related Control>

The control ECU 10 determines whether or not all of the following conditions (A1) to (A3) are satisfied. When all of the following conditions (A1) to (A3) are satisfied, the control ECU 10 determines that an erroneous operation condition becomes satisfied to determine that "a state (that is, an erroneous operation state) has occurred in which the driver operates the accelerator pedal 22a with mistaking the accelerator pedal 22a for another driving operation element (for example, the brake pedal 34a)".

Condition (A1): The vehicle speed Vsv is equal to or lower than a threshold speed Vth.

Condition (A2): The object is located in a short distance area SA (referring to FIG. 2). The short distance area SA is an area within a predetermined distance Lb which is shorter than the predetermined distance La from the front end center position of the vehicle SV.

Condition (A3): The accelerator pedal operation amount AP is equal to or larger than a threshold operation amount APth (for example, 90%).

The control ECU 10 determines that the erroneous operation state has ended, when the accelerator pedal operation amount AP is/becomes "0%".

The control ECU 10 limits/suppresses the drive force of the vehicle SV when the control ECU 10 determines that the erroneous operation state is occurring. More specifically, the control ECU 10 transmits the target acceleration Gtgt which is determined based on the vehicle speed Vsv to the engine ECU 20 and the brake ECU 30. The target acceleration Gtgt is "0" when the vehicle speed Vsv is "0". The target acceleration Gtgt becomes lower as the vehicle speed Vsv becomes higher. In other words, the target acceleration Gtgt is equal to or lower than zero. The target acceleration Gtgt may be referred to "a limit target acceleration LMT_Gtgt" or "a target acceleration LMT_Gtgt".

When the engine ECU 20 receives the limit target acceleration LMT_Gtgt, the engine ECU 20 controls the engine actuator 26 in such a manner that the actual throttle valve opening degree TA becomes equal to "0".

When the brake ECU 30 receives the target acceleration LMT_Gtgt, the brake ECU 30 controls the brake actuator 36 based on the received target acceleration LMT_Gtgt or the target operation acceleration, whichever is lower. When the brake ECU 30 receives both of the target acceleration LMT_Gtgt and "any one of the target acceleration ACC_Gtgt and the target acceleration CC_Gtgt", the brake ECU 30 controls the brake actuator 36 based on the smallest one among the received target accelerations and the target operation acceleration.

(Outline of Operation)

When the control ECU 10 starts the erroneous operation related control (in other words, when the erroneous operation state has just occurred) while executing the adaptive cruise control, the control ECU 10 ends the adaptive cruise control, even if the adaptive cruise control end condition is not satisfied. Hereby, when the control ECU 10 ends the erroneous operation related control later (in other words, when the erroneous operation state ends), the control ECU 10 can prevent the adaptive cruise control from accelerating the vehicle SV suddenly (i.e., the control ECU 10 can prevent the vehicle SV from being rapidly accelerated due to the adaptive cruise control).

Figure 3:
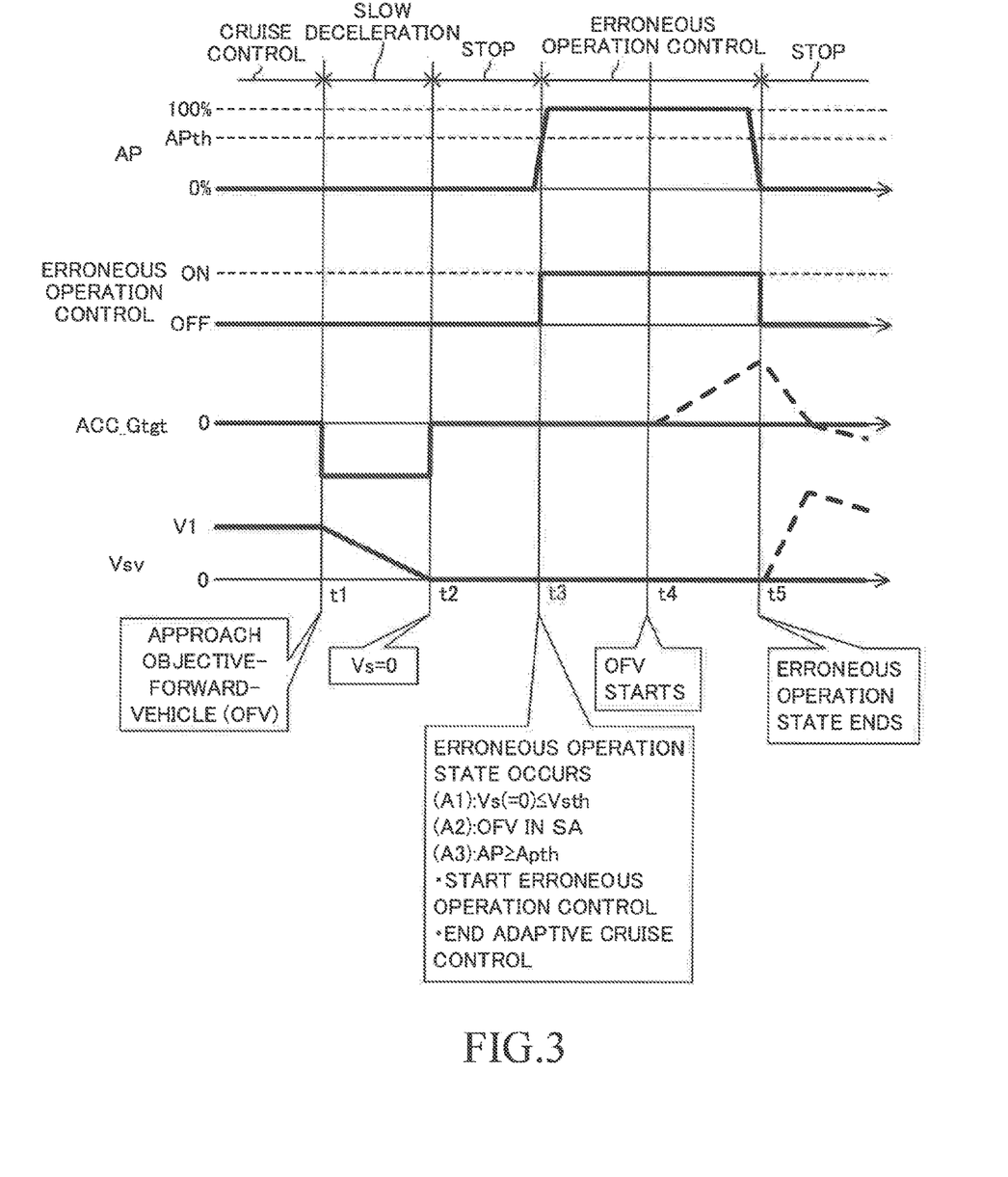
FIG. 3 is a timing chart for illustrating an outline of a process of the present control device.

An example of the operation of the present control device will be described with reference to FIG. 3.

In the example, the objective-forward-vehicle is present in the objective-forward-vehicle area PA, and the objective-forward-vehicle is traveling at a vehicle speed V1 before a time point t1. The vehicle SV is traveling at the vehicle speed V1 in such a manner that the vehicle SV keeps the inter-vehicle distance Dfx(a) between the objective-forward-vehicle and the vehicle SV at the target inter-vehicle distance Dfx(a).

The objective-forward-vehicle starts decelerating just before the time point t1, and stops just before a time point t2. In this case, the vehicle SV starts decelerating at the time point t1, and stops (the vehicle speed Vsv of the vehicle SV becomes "O") at the time point t2.

All of the above conditions (A1) to (A3) become satisfied at a time point t3. Therefore, the control ECU 10 ends the adaptive cruise control to start the erroneous operation related control. At the time point t3, the target acceleration LMT_Gtgt is "0", because the vehicle speed Vsv is "0". Accordingly, the vehicle SV continues to stop at and after the time point t3.

The objective-forward-vehicle starts (in other words, the objective-forward-vehicle starts accelerating) at a time point t4. Even though the objective-forward-vehicle starts, the vehicle SV stops, because the erroneous operation related control is executed at the time point t4.

The accelerator pedal operation amount AP becomes "0%" at a time point t5, so that the erroneous operation state ends. Thus, the control ECU 10 ends the erroneous operation related control at the time point t5. The vehicle SV continues to stop at and after the time point t5, unless the driver operates the accelerator pedal 22a, because the adaptive cruise control ended at the time point t3.

Whereas, a case in which the adaptive cruise control continues to be executed when the erroneous operation related control is started at the time point t3 is described. When the control ECU 10 starts the erroneous operation related control, the engine ECU 20 receives the target acceleration ACC_Gtgt and the target acceleration LMT_Gtgt. It is considered that the engine ECU 20 controls the drive force of the vehicle SV based on the target acceleration LMT_Gtgt. The vehicle SV continues to stops at and after the time point t3.

Even when the objective-forward-vehicle starts at the time point t4, the vehicle SV continues to stop (does not move) owing to the erroneous operation related control. This causes the inter-vehicle distance Dfx(a) and the relative speed Vfx(a) to increase (becomes larger) as time passes. Thus, as shown in a dotted line of FIG. 3, the target acceleration ACC_Gtgt increases as time passes.

When the erroneous operation related control is ended at the time point t5, the drive force of the vehicle SV starts to be controlled based on the target acceleration ACC_Gtgt at the time point t5. Therefore, the vehicle SV accelerates suddenly. This sudden acceleration has a high possibility to give the uncomfortable feeling to the driver.

As described above, the present control device ends the adaptive cruise control when the present control device starts the erroneous operation related control at the time point t3. Therefore, the drive force of the vehicle SV is not controlled based on the large target acceleration ACC_Gtgt at and after the time point t5 at which the erroneous operation state ends. Accordingly, the present control device can prevent the vehicle SV from being accelerated suddenly at the time point t5.

(Specific Operation)
<Adaptive Cruise Control Routine>

The CPU of the control ECU 10 (hereinafter, the term "CPU" means the CPU of the control ECU 10 unless otherwise specified) is configured to execute an adaptive cruise control routine represented by a flowchart shown in FIG. 4, every time a predetermined time elapses.

Figure 4:
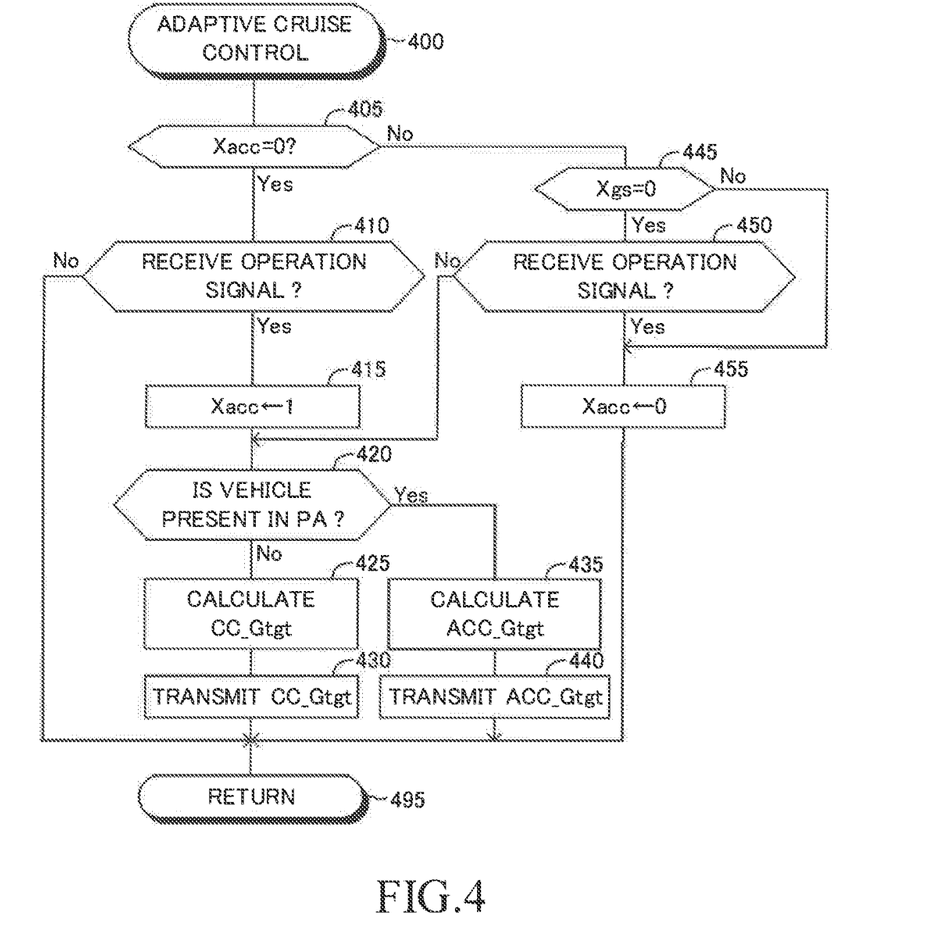
FIG. 4 is a flowchart for illustrating a routine executed by a CPU of a control ECU illustrated in FIG. 1.

When a predetermined timing has come, the CPU starts processes from Step 400 shown in FIG. 4, and proceeds to Step 405 to determine whether or not a value of an ACC flag Xacc is "0".

The CPU sets the value of the ACC flag Xacc to "1" (referring to Step 415 described later) when the CPU starts the adaptive cruise control. The CPU sets the value of the ACC flag Xacc to "0" (referring to Step 455 described later) when the CPU ends the adaptive cruise control. Furthermore, the CPU sets the value of the ACC flag Xacc to "0" though an initialization routine which the CPU executes when the driver changes a position of an ignition key switch (now shown) of the vehicle SV from an off-position to an on-position.

When the value of the ACC flag Xacc is "0" (in other words, when the CPU is not executing the adaptive cruise control), the CPU makes a "Yes" determination at Step 405, and proceeds to Step 410 to determine whether or not the control ECU 10 has received the operation signal transmitted from the ACC operation switch 13. When the control ECU 10 has not received the operation signal, the CPU makes a "No" determination at Step 410, and proceeds to Step 495 to tentatively terminate the present routine.

Whereas, when the control ECU 10 has received the operation signal, the adaptive cruise control start condition becomes satisfied. In this case, the CPU makes a "Yes" determination at Step 410, and proceeds to Step 415 to set the value of the ACC flag Xacc to "1".

Subsequently, the CPU proceeds to Step 420 to determine whether or not a vehicle is present in the objective-forward-vehicle area PA based on the above described object information. When no vehicle is present in objective-forward-vehicle area PA, the CPU makes a "No" determination at Step 420, and executes processes of Steps 425 and 430 in that order. Thereafter, the CPU proceeds to Step 495 to tentatively terminate the present routine.

Step 425: The CPU calculates the target acceleration CC_Gtgt.

Step 430: The CPU transmits the target acceleration CC_Gtgt to the engine ECU 20 and the brake ECU 30.

Whereas, when a vehicle is present in the objective-forward-vehicle area PA at a time point at which the CPU proceeds to Step 420, the CPU makes a "Yes" determination at Step 420, and executes processes of Steps 435 and 440 in that order. Thereafter, the CPU proceeds to Step 495 to tentatively terminate the present routine.

Step 435: The CPU calculates the target acceleration ACC_Gtgt.

Step 440: The CPU transmits the target acceleration ACC_Gtgt to the engine ECU 20 and the brake ECU 30.

When the CPU proceeds to Step 405 again after the CPU set the value of the ACC flag Xacc to "1", the CPU makes a "No" determination at Step 405. Thereafter, the CPU proceeds to Step 445 to determine whether or not a value of an erroneous operation flag Xgs is "0".

The CPU sets the value of the erroneous operation flag Xgs to "1" (referring to Step 525 shown in FIG. 5) when the CPU starts the erroneous operation related control. The CPU sets the value of the erroneous operation flag Xgs to "0" (referring to Step 545 shown in FIG. 5) when the CPU ends the erroneous operation related control. Furthermore, the CPU sets the value of the erroneous operation flag Xgs to "0" though the initialization routine.

When the value of the erroneous operation flag Xgs is "0", the CPU makes a "Yes" determination at Step 445, and proceeds to Step 450. At Step 450, the CPU determines whether or not the control ECU 10 has received the operation signal transmitted from the ACC operation switch 13.

When the control ECU 10 has not received the operation signal, the CPU makes a "No" determination at Step 450, and proceeds to Step 420. Thus, when the objective-forward-vehicle is present, the CPU continues to calculate the target acceleration ACC_Gtgt.

Whereas, the control ECU 10 has received the operation signal at a time point at which the CPU proceeds to Step 450, the adaptive cruise control end condition becomes satisfied. In this case, the CPU makes a "Yes" determination at Step 450, and proceeds to Step 455 to set the value of the ACC flag Xacc to "0". Thereafter, the CPU proceeds to Step 495 to tentatively terminate the present routine.

When the value of the erroneous operation flag Xgs is "1" at a time point at which the CPU proceeds to Step 445, the CPU makes a "No" determination at Step 445, and proceeds to Step 455 to set the value of the ACC flag Xacc to "0". Thereafter, the CPU proceeds to Step 495 directly to tentatively terminate the present routine. Thus, when the CPU starts the erroneous operation related control while the CPU is executing the adaptive cruise control, the CPU ends the adaptive cruise control, even when the control ECU 10 has not received the operation signal (in other words, even if the adaptive cruise control end condition does not become satisfied). In this case, the CPU executes neither the cruise control nor the adaptive cruise control. Therefore, even if the objective-forward-vehicle is present, the CPU does not calculate the target acceleration ACC_Gtgt.

<Erroneous Operation Related Control Routine>

Figure 5:
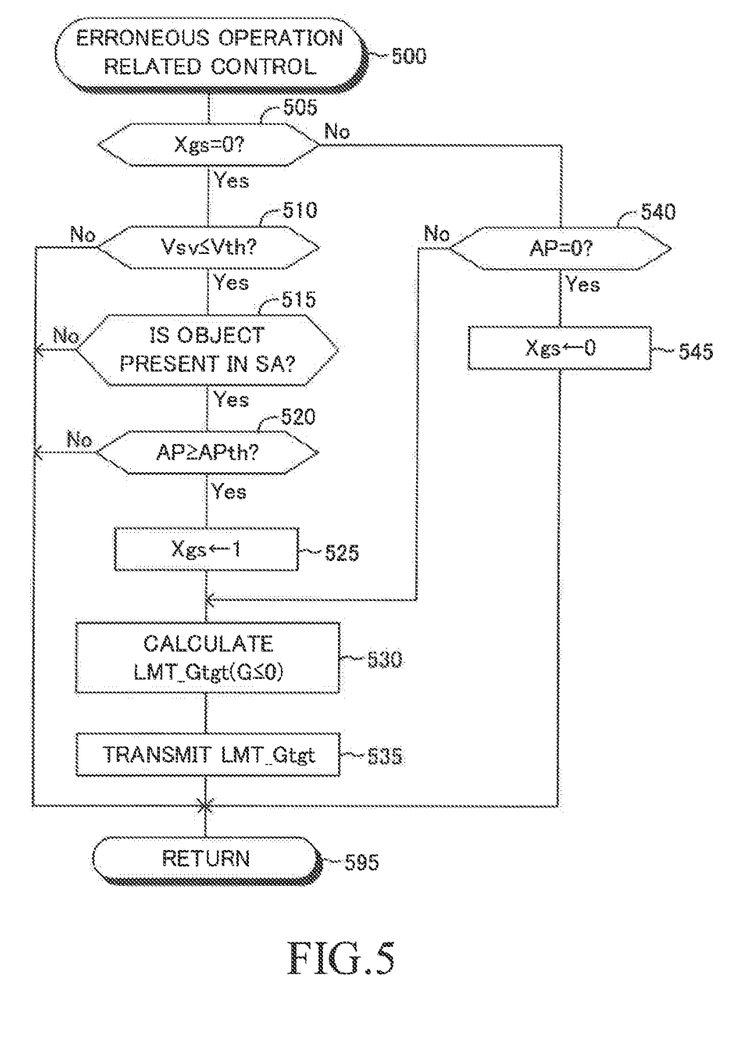
FIG. 5 is a flowchart for illustrating the other routine executed by the CPU of the control ECU illustrated in FIG. 1.

The CPU is configured to execute an erroneous operation related control routine represented by a flowchart shown in FIG. 5, every time a predetermined time elapses.

When a predetermined timing has come, the CPU starts processes from Step 500 shown in FIG. 5, and proceeds to Step 505 to determine whether or not the value of the erroneous operation flag Xgs is "0".

When the value of the erroneous operation flag Xgs is "0", the CPU makes a "Yes" determination at Step 505, and proceeds to Step 510 to determine whether or not the vehicle speed Vsv is equal to or lower than the threshold vehicle speed Vth. When the vehicle speed Vsv is higher than the threshold vehicle speed Vth, the above condition (A1) is not satisfied. In this case, the CPU makes a "No" determination at Step 510, and proceeds to Step 595 to tentatively terminate the present routine.

Whereas, when the vehicle speed Vsv is equal to or lower than the threshold vehicle speed Vth at a time point at which the CPU proceeds to Step 510, the above condition (A1) is satisfied. In this case, the CPU makes a "Yes" determination at Step 510, and proceeds to Step 515 to determine whether or not an object is present in the short distance area SA. When no object is present in the short distance area SA, the above condition (A2) is not satisfied. In this case, the CPU makes a "No" determination at Step 515, and proceeds to Step 595 to tentatively terminate the present routine.

Whereas, when the object is present in the short distance area SA at a time point at which the CPU proceeds to Step 515, the above condition (A2) is satisfied. In this case, the CPU makes a "Yes" determination at Step 515, and proceeds to Step 520 to determine whether or not the accelerator pedal operation amount AP is equal to or larger than the threshold operation amount APth. When the accelerator pedal operation amount AP is smaller than the threshold operation amount APth, the above condition (A3) is not satisfied. In this case, the CPU makes a "No" determination at Step 520, and proceeds to Step 595 to tentatively terminate the present routine.

Whereas, the accelerator pedal operation amount AP is equal to or larger than the threshold operation amount APth at a time point at which the CPU proceeds to Step 520, the above condition (A3) is satisfied. In this case, the erroneous operation condition is satisfied, because all of the conditions (A1) to (A3) are satisfied. The CPU makes a "Yes" determination at Step 520, and executes processes of Steps 525 to 535 in that order to execute the erroneous operation related control for limiting the drive force. Thereafter, the CPU proceeds to Step 595 to tentatively terminate the present routine.

Step 525: The CPU sets the value of the erroneous operation flag Xgs to "1".

Step 530: The CPU calculates the target acceleration LMT_Gtgt based on the vehicle speed Vsv.

Step 535: The CPU transmits the target acceleration LMT_Gtgt to the engine ECU 20 and the brake ECU 30.

Whereas, when the CPU proceeds to Step 505 again after the CPU set the value of the erroneous operation flag Xgs to "1" at step 525, the CPU makes a "No" determination at Step 505, and proceeds to Step 540 to determine whether or not the accelerator pedal operation amount AP is equal to or smaller than "0%". In other words, the CPU determines whether or not the accelerator pedal operation amount AP is equal to or smaller than an end threshold which is smaller than the threshold operation amount APth at Step 540.

When the accelerator pedal operation amount AP is not "0%" (in other words, when the erroneous operation state continues), the CPU makes a "No" determination at Step 540, and proceeds to Step 530. Accordingly, the CPU continues to execute the erroneous operation related control. Whereas, the accelerator pedal operation amount AP is "0%" (in other words, when the erroneous operation state ends), the CPU makes a "Yes" determination at Step 540, and proceeds to Step 545 to set the value of the erroneous operation flag Xgs to "0". Thereafter, the CPU proceeds to Step 595 to tentatively terminate the present routine.

As understood from the above, when the CPU sets the value of the erroneous operation flag Xgs to "1" to start the erroneous operation related control (Step 525, "No" at Step 445), the CPU sets the value of the ACC flag Xacc to "0" to end the adaptive cruise control (Step 455). Accordingly, when the CPU ends the erroneous operation related control which the CPU started while the CPU was executing the adaptive cruise control, the CPU can prevent the vehicle SV from being accelerated suddenly (due to the adaptive cruise control).

The present disclosure is not limited to the above described embodiment, and can employ various other modifications within a scope of the present disclosure.

For example, the CPU may determine whether or not the above condition (A2) is satisfied based on information which is obtained from at least one of the laser radar device 14 and the sonar devices 15a to 15d, instead of the information which is obtained from the millimeter wave radar device 11 and the camera device 12.

The laser radar device 14 is different from the millimeter wave radar device 11 in terms of using laser light instead of the millimeter waves. Each of the sonar devices 15 is different from the millimeter wave radar device 11 in terms of using ultrasonic waves instead of the millimeter waves. The laser radar device 14 and the sonar devices 15 can obtain object information which is substantially the same as the object information which the millimeter wave radar device 11 obtains.

Furthermore, the CPU may detect the objective-forward-vehicle based on only the object information which the millimeter wave radar device 11 obtains. In this case, if intensity of reflection waves which the millimeter wave radar device 11 receives is equal to or larger than threshold intensity, the CPU determines that the object which reflects the millimeter waves is the vehicle. Furthermore, the CPU may detect the objective-forward-vehicle based on only the object information which the camera device 12 obtains.

Furthermore, necessary conditions for the erroneous operation condition to be satisfied are not limited to be the above conditions (A1) to (A3). For example, the CPU may determine that the erroneous operation condition is satisfied when both of the following conditions (B1) and (B2) are satisfied.

Condition (B1): The accelerator pedal operation amount AP is equal to or larger than the threshold operation amount APth.

Condition (B2): An accelerator pedal operation speed APV is equal to or higher than a threshold speed APVth. The accelerator pedal operation speed APV is an increase amount of the accelerator pedal operation amount AP per a unit time.

The threshold operation amount APth in the above condition (B1) may be different from the threshold operation amount APth in the above condition (A3). Furthermore, the CPU may determine that the erroneous operation condition is satisfied when all of a first condition and a second condition are satisfied. The first condition is satisfied when both of the conditions (B1) and (B2) are satisfied. The second condition is satisfied when at least one of the conditions (A1) and (A2) is satisfied.

Furthermore, the CPU may determine that the erroneous operation state ends when the accelerator pedal operation amount AP is equal to or smaller than a threshold end operation amount APENDth (which is positive) and which is smaller than the threshold operation amount APth after the CPU determined that the erroneous operation state occurred.

The CPU may execute the following erroneous operation related control (in place of the above described erroneous operation related control). The CPU determines a gain Kgs based on "the vehicle speed Vsv and the accelerator operation amount AP" obtained at the present time point to transmit the gain Kgs to the engine ECU 20. The gain Kgs is an arbitrary value which is equal to or larger than "0" and smaller than "1".

The engine ECU 20 controls the engine actuator 26 in such a manner that the actual throttle valve opening degree TA becomes equal to a target throttle valve opening degree (=Kgs·TA1tgt) which is obtained by multiplying the first target throttle valve opening degree TA1tgt and the gain Kgs.

In the erroneous operation related control, at Step 530 shown in FIG. 5, the CPU may obtain the target acceleration LMT_Gtgt which has been set to a predetermined constant value regardless of the vehicle speed Vsv. For example, the constant value is equal to or smaller than "0".

As understood from the above, the erroneous operation related control can be expressed as a control for making the "drive force which applied to the vehicle SV" smaller than the normal operation drive force (the drive force to be applied to the vehicle SV when the erroneous operation related control is not being executed) which is determined based on the accelerator pedal operation amount AP which the driver changes.

Furthermore, the accelerator (element) is not limited to the accelerator pedal 22a which the driver operates with the driver's foot. For example, the accelerator may be a lever which the driver operates with the drivers hand.

What is claimed is:

1. A vehicle control device comprising:
    an operation amount sensor for measuring an operation amount of an accelerator element which a driver of a vehicle operates in order to accelerate the vehicle;
    an object sensor for detecting an object ahead of the vehicle; and
    a controller for applying a normal operation drive force which is determined depending on the operation amount to the vehicle, while executing neither an adaptive cruise control nor an erroneous operation related control,
    wherein the controller is configured to:
        execute the adaptive cruise control for applying a drive force which is required for an acceleration of the vehicle to become equal to an adaptive cruise control target acceleration to the vehicle, during a time period from a time point at which an adaptive cruise control start condition becomes satisfied to a time point at which an adaptive cruise control end condition becomes satisfied, the adaptive cruise control target acceleration being an acceleration which increases as a difference between an inter-vehicle distance from the vehicle to an objective-forward-vehicle and a target inter-vehicle distance increases, the objective-forward-vehicle is another vehicle which is ahead of the vehicle and is detected by the object sensor;
        end the adaptive cruise control, even if the adaptive cruise control end condition has not been satisfied, when an erroneous operation start condition becomes satisfied in a time period from a time point at which the adaptive cruise control start condition becomes satisfied to a time point at which the adaptive cruise control end condition becomes satisfied, the erroneous operation start condition being a condition which becomes satisfied when an erroneous operation state occurs in which the driver operates the accelerator element with mistaking the accelerator element for another driving operation element; and
        execute the erroneous operation related control for applying a drive force which is smaller than the normal operation drive force to the vehicle during a time period from a time point at which the erroneous operation start condition becomes satisfied to a time point at which an erroneous operation end condition becomes satisfied, the erroneous operation end condition being a condition which becomes satisfied when the erroneous operation state ends.

2. The vehicle control device according to claim 1 further comprising a vehicle speed sensor for measuring a vehicle speed of the vehicle,
    wherein the controller is configured to:
        determine that the adaptive cruise control start condition becomes satisfied when the controller receives an input indicative of a start operation which the driver performs in order to request the controller to start the adaptive cruise control;
        determine that the adaptive cruise control end condition becomes satisfied when the controller receives an input indicative of an end operation which the driver performs in order to request the controller to end the adaptive cruise control;
        determine that the erroneous operation start condition becomes satisfied when the operation amount becomes equal to or larger than a first threshold operation amount under a situation in which the vehicle speed is equal to or lower than a threshold speed and the object is present in a predetermined area around the vehicle; and
        determine that the erroneous operation end condition becomes satisfied when the operation amount becomes equal to or smaller than a second threshold operation amount which is smaller than the first threshold operation amount after the erroneous operation start condition has become satisfied.

* * * * *